United States Patent [19]
Hutchison

[11] Patent Number: 4,992,648
[45] Date of Patent: Feb. 12, 1991

[54] DATA TRANSFER SYSTEM FOR CURRENCY CASSETTES

[75] Inventor: Brian G. Hutchison, Dundee, Great Britain

[73] Assignee: NCR Corporation, Dayton, Ohio

[21] Appl. No.: 433,816

[22] Filed: Nov. 9, 1989

[30] Foreign Application Priority Data

Apr. 14, 1989 [GB] United Kingdom ................ 8908528

[51] Int. Cl.$^5$ ............................................ G06F 15/30
[52] U.S. Cl. .................................... 235/379; 235/380; 235/381; 235/383; 902/5; 902/27
[58] Field of Search .............. 235/379, 380, 381, 383; 902/5, 27

[56] References Cited

U.S. PATENT DOCUMENTS

| | | | |
|---|---|---|---|
| 4,423,313 | 12/1983 | Tanigaki | 235/379 |
| 4,458,802 | 6/1984 | Maciver et al. | 235/381 |
| 4,650,978 | 3/1987 | Hudson | 235/379 |
| 4,670,643 | 6/1987 | Hain et al. | 235/379 |

Primary Examiner—Harold Pitts
Attorney, Agent, or Firm—Wilbert Hawk, Jr.; Albert Sessler, Jr.; Elmer Wargo

[57] ABSTRACT

A data transfer system includes a currency cassette adapted to be inserted in a cassette receiving compartment of a cash dispenser mechanism, the cassette having a first printed circuit board on which are mounted a RAM, a microprocessor connected to the RAM, a photodiode adapted to receive data from an LED mounted on a second printed circuit board secured to the cassette receiving compartment, and LED adapted to transmit data to a photodiode mounted on the second board, and a first circuit including a first coil adapted to receive power from second circuit including a second coil mounted on the second board. In operation, data is transferred between the RAM and a microprocessor external to the cassette by means of the cooperating photodiodes and LEDs, with the first circuit serving to provide a dc power supply for the other components mounted on the board.

16 Claims, 6 Drawing Sheets

DATA TRANSFER SYSTEM FOR CURRENCY CASSETTES

BACKGROUND OF THE INVENTION

This invention relates to data transfer systems for transferring data relating to currency note containers of the kind used with cash dispensing machines. Such containers will hereinafter be referred to as currency cassettes.

The invention has application, for example, to automated teller machines (ATMs) of the kind wherein a user inserts a customer identifying card into the machine and then enters certain data (such as codes, quantity of currency required or to be paid in, type of transaction, etc.) upon a keyboard associated with the machine. The machine then processes the transaction, updates the user's account to reflect the current transaction, dispenses cash, when requested, from one or more currency cassettes mounted in the machine, and returns the card to the user as part of a routine operation. It is common for an ATM to dispense currency notes of at least two different denominations, in which case the ATM will normally include a separate currency cassette for notes of each particular denomination.

In order to enhance the versatility and flexibility of an ATM, it may be desirable for each currency cassette incorporated therein to carry machine-readable identification means for identifying the cassette and for providing information as to the contents of the cassette, such as the quantity and denomination of the notes contained therein. Also, it may be advantageous, for maintenance purposes, for a cassette to provide information concerning its functional history.

It is known, for example, for a currency cassette to carry on the outside thereof machine-readable identification means in the form of a predetermined array of switch actuating means, such as an array of magnets, the cooperating switch means being disposed on a cassette receiving compartment of a cash dispensing machine in which the cassette is adapted to be inserted. Such a known currency cassette identification system has the disadvantage that the array of switch actuating means can store only a limited amount of information.

Also, from U.K. Patent No. 2165383 there is known a currency cassette provided on its outside with machine-readable data storage means in the form of a card having a magnetic stripe. Data recorded in the stripe is read by a read head attached to a carrier which is slidably mounted on support means forming part of a cassette receiving compartment of a cash dispenser mechanism with which the cassette is arranged to be inserted. Upon completion of the insertion of the cassette into said compartment, the carrier is moved by a spring in a controlled manner along the support means so as to cause the read head to read the data recorded in the stripe. One problem experienced with this known system is that it is necessary for the read head to be mounted extremely accurately in relation to the cassette if reliable operation is to be achieved. Problems may also be experienced due to the tendency for dirt to build up on the read head.

SUMMARY OF THE INVENTION

It is an object of the invention to provide a data transfer system including a currency cassette provided with data storage means, which system alleviates the disadvantage and problems referred to above.

According to the invention there is provided in an automated teller machine a system comprising: a currency dispensing means for dispensing currency; a cassette for storing currency to be dispensed; a cassette receiving means located in said currency dispensing means for receiving said cassette; said cassette having first data processing means for processing data associated with the currency to be dispensed; said cassette receiving means having second data processing means for processing data associated with the currency to be dispensed; said cassette also having first circuit means for processing power to be used by said first data processing means; said cassette receiving means also having second circuit means for processing power to be used by said first data processing means; and said first and second circuit means including first and second coils, respectively, with said first and second coils acting as a transformer when said cassette is mounted in an operational position in said cassette receiving means so as to transfer power from said second circuit means to said first circuit means.

In another aspect of the invention there is provided a data transfer system comprising: a currency cassette having data storage means; and currency dispensing means for dispensing currency; said currency dispensing means having a cassette receiving means into which said cassette is adapted to be inserted; said cassette having random access memory means forming said data storage means, first data receiving and transmitting means, first data processing means connected to said random access memory means and to said first data receiving and transmitting means, and first circuit means including a first coil means; said cassette receiving means including second data receiving and transmitting means and second circuit means including second coil means, said second data receiving and transmitting means and said second coil means being mounted on said cassette receiving means so as to be respectively positioned adjacent said first data receiving and transmitting means and said first coil means when said cassette is mounted in an operational position in said cassette receiving means to enable data to be transferred in a non-contact manner between said random access memory means and second data processing means external to said cassette via said first data processing means and said first and second data receiving and transmitting means, and to enable said first and second circuit means to transfer power from said cassette receiving means to said cassette with said first and second coil means acting as a transformer, said first circuit means serving to provide a dc voltage supply for said cassette.

In yet another aspect of the invention there is provided a currency cassette having data storage means; said cassette comprising: random access memory means forming said data storage means; data processing means connected to said random access memory means; first data receiving means connected to said first data processing means to receive data in a non-contact manner from first data transmitting means external to said cassette; said data processing means further comprising: means to write the received data into said random access memory means; second data transmitting means adapted to receive data from said random access memory means via said data processing means and to transmit this data in a non-contact manner to second data receiving means external to said cassette; and first circuit means including first coil means adapted to receive power from second circuit means including second coil means external to said cassette, with said first and second coil means acting as a transformer, and with said first circuit means serving to provide a dc voltage supply for said cassette.

Preferred embodiments of the invention will now be described by way of example with reference to the following specification, claims, and drawing.

DETAILED DESCRIPTION OF THE PREFERRED EMBODIMENTS

Figure 1:
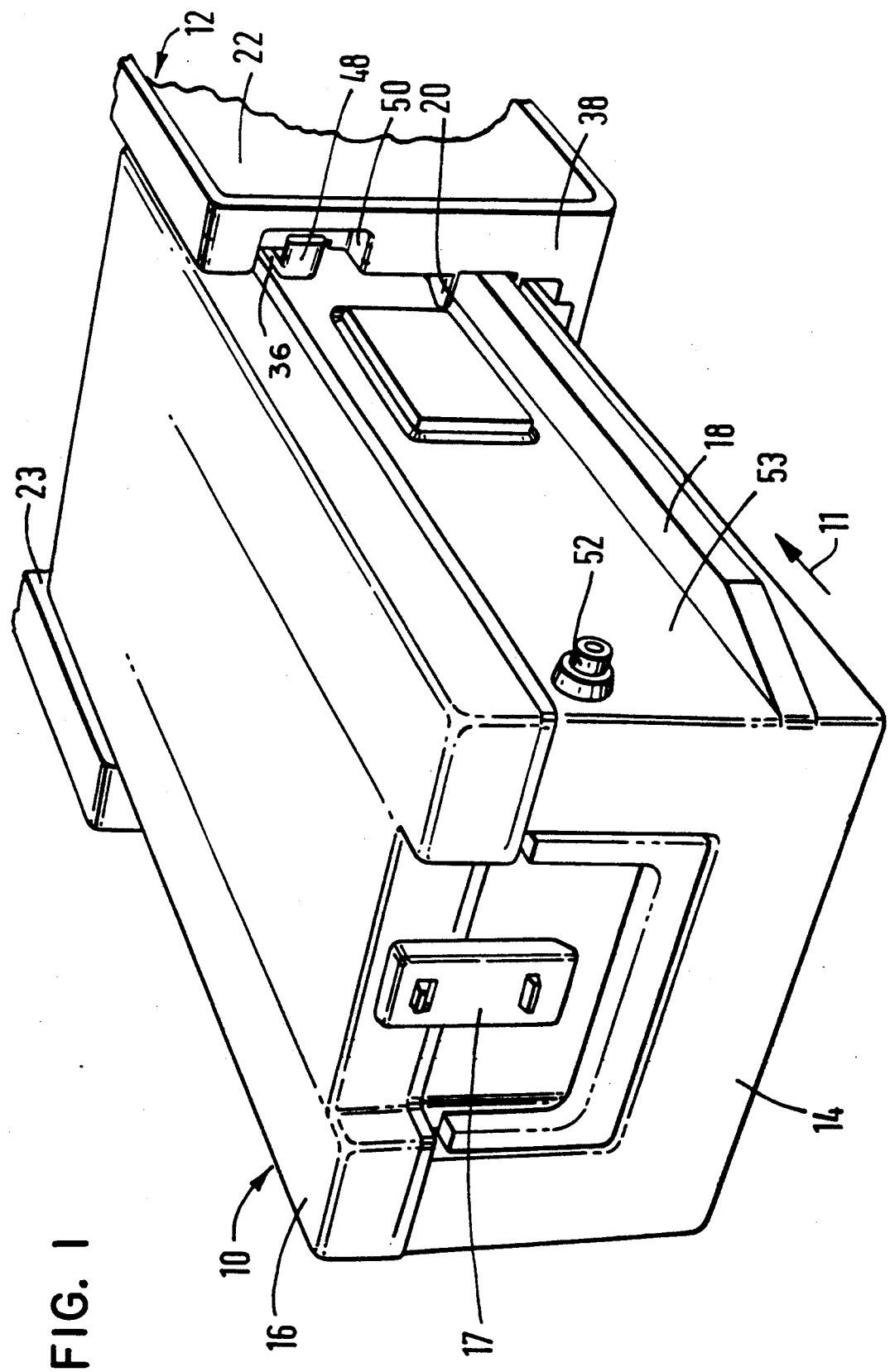
FIG. 1 is a general perspective view, shown partly broken away, of a data transfer system made in accordance with the present invention, the system including a currency cassette shown partially inserted in a cassette receiving compartment of a cash dispenser mechanism.

Referring to FIG. 1, a cassette 10 for currency notes is adapted to be inserted (in the direction indicated by the arrow 11) into a receiving compartment 12 formed in the rear of a cash dispenser mechanism of an ATM (not otherwise shown). The cassette 10 comprises a note containing receptacle 14 and a lid 16 which is pivotally connected at one end to the receptacle 14 and which may be held in a locked position by locking means 17. Both the receptacle 14 and the lid 16 are made of plastic material. The right-hand end (with reference to FIG. 1) of the cassette 10 is provided with a conventional door (not shown) which is held in a closed position prior to the cassette 10 being loaded into the dispenser mechanism, but which door is arranged to be opened automatically upon the cassette 10 being inserted into the compartment 12. With the cassette 10 correctly located in a fully inserted position in the compartment 12, notes can be extracted from the receptacle 14 via the open cassette door by means of a pick mechanism (not shown) included in the dispenser mechanism, for feeding and presenting the notes to a customer.

The outer surfaces of the side walls of the cassette 10 are respectively provided with two horizontally extending rails 18, with only one side rail 18 being shown in FIG. 1. The rails 18 are respectively adapted to slidably engage two horizontally extending guide means 20 of generally U-shaped cross-section which are respectively provided on the inner surfaces of two vertical side walls 22, 23 of the compartment 12. Only one of the horizontally extending guide means 20 is shown in FIG. 1. During the insertion of the cassette 10 into the compartment 12, the leading ends (right-hand ends with reference to FIG. 1) of the rails 18 are directed into the guide members 20 and thereafter the cassette 10 is guided into the compartment 12 by virtue of the rails 18 sliding along the guide members 20 until the cassette 10 reaches its fully inserted position. Insertion of the cassette 10 into the compartment 12 is facilitated by virtue of a flared configuration of an end portion 24 (FIG. 2) of each guide member 20.

Figure 2:
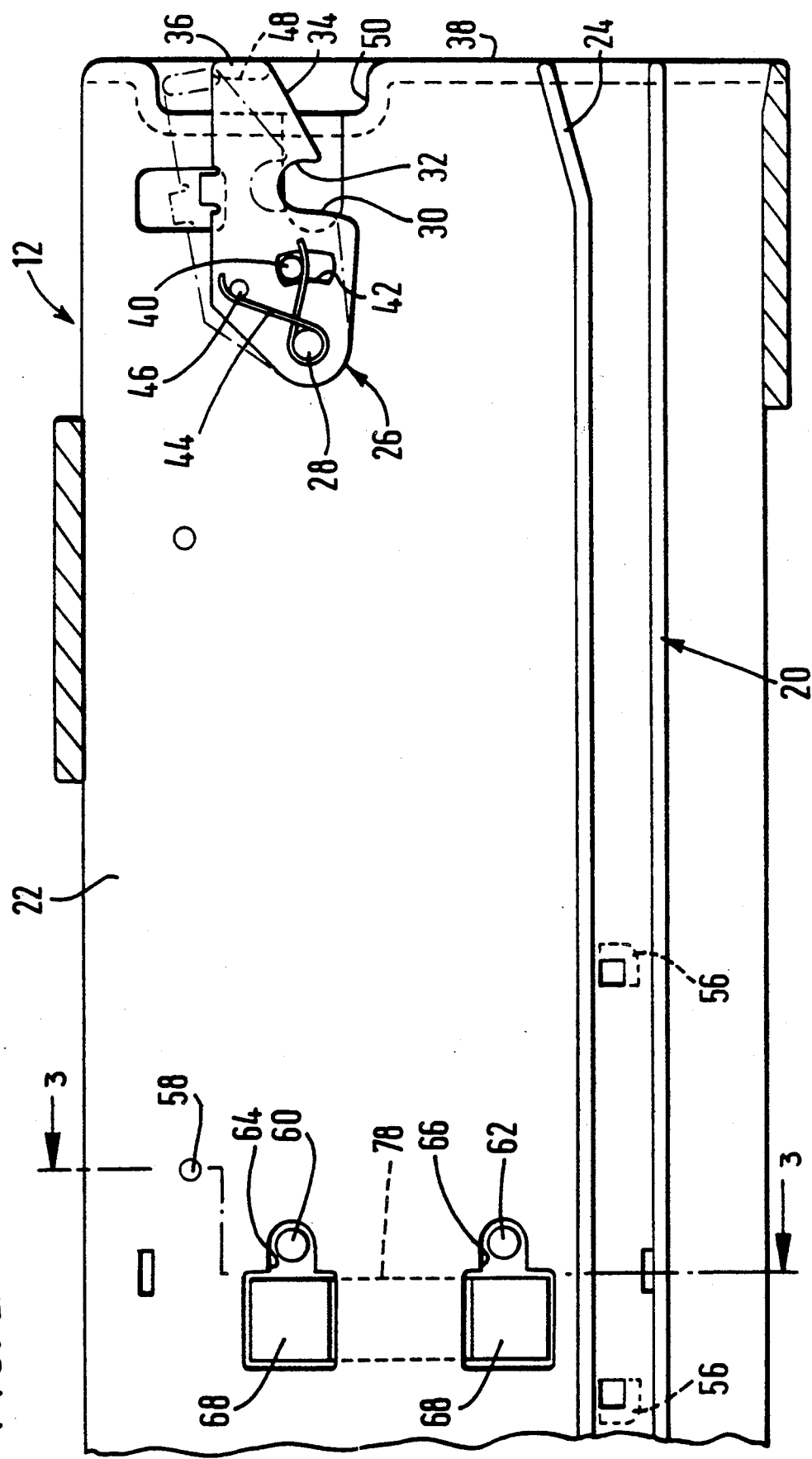
FIG. 2 is a side elevational view of part of one of inner side walls of the cassette receiving compartment shown in FIG. 1.

As shown in FIG. 2, the inner surface of the side wall 22 of the compartment 12 has mounted thereon a latch and stop member 26, the member 26 being pivotally mounted on a stud 28 secured to the side wall 22. As shown in FIG. 2, the lower edge of the member 26 incorporates a vertically extending stop surface 30, a semicircular recess 32, and a cam portion 34 extending between the recess 32 and an end portion 36 positioned adjacent the front end 38 (with reference to FIG. 1) of the side wall 22. Pivotal movement of the member 26 relative to the side wall 22 is limited by virtue of a stud 40 secured to the wall 22 engaging an arcuate slot 42 formed in the member 26. The member 26 is normally resiliently held in the rest position shown in FIG. 2, in which the stud 40 is in engagement with the upper end of the slot 42 by means of a torsion spring 44 mounted on the stud 28, the ends of the spring 44 respectively engaging the stud 40 and a further stud 46 secured to the member 26. The member 26 can be manually pivoted in a counter-clockwise direction (with reference to FIG. 2) away from this rest position by means of a lug 48 (best shown in FIG. 1) secured to the end portion 36 and disposed in a recess 50 formed in the front end 38 of the side wall 22.

When the cassette 10 is inserted into the compartment 12 in the direction of the arrow 11 in FIG. 1, a latch stud 52 (FIG. 1) provided on the outer surface of a side wall 53 of the cassette 10 engages the cam surface 34 (FIG. 2) of the latch and stop member 26 shortly before the cassette 10 reaches its fully inserted position. Continued movement of the cassette 10 in the direction of the arrow 11 brings about a pivotal movement of the member 26 away from its rest position until the latch stud 52 on the cassette 10 engages the stop surface 30, at which point the torsion spring 44 brings about a return movement of the member 26 towards its rest position so as to bring the recess 32 into engagement with the latch stud 52. The cassette 10 is now securely and accurately latched in its correct operational position in the receiving compartment 12. It should be understood that the member 26 can be readily disengaged from the latch stud 52 by manually moving the lug 48 in an upward direction (as viewed in FIG. 1), whereupon the cassette 10 may be slid out of the compartment 12.

Figure 3:
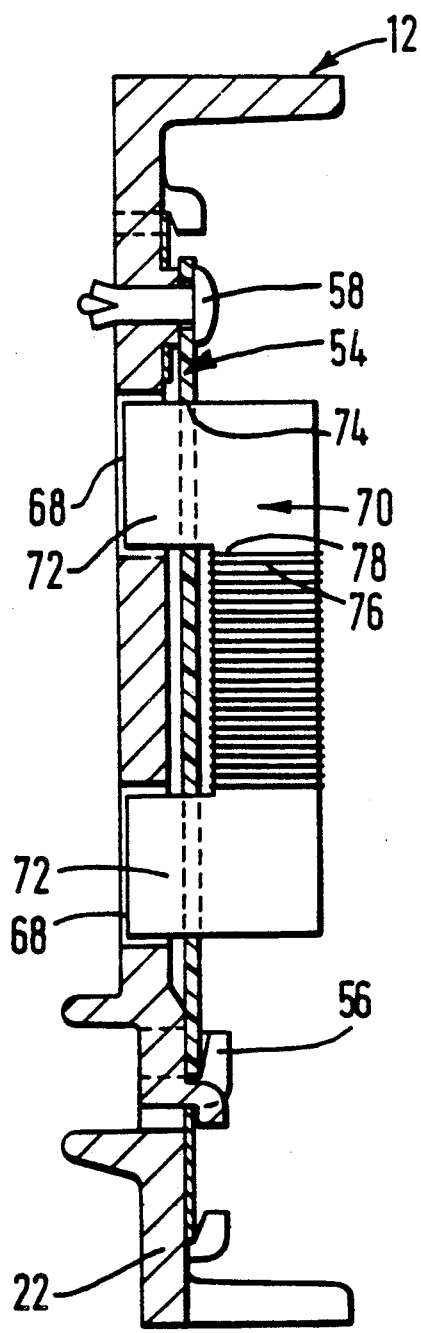
FIG. 3 is a sectional elevational view taken along the line 3—3 of FIG. 2.

Referring now also to FIG. 3, a printed circuit board 54 is mounted on the outer surface of the side wall 22. The printed circuit board 54 is held in position by virtue of the lower edge of the board fitting behind a pair of lips 56 formed integrally with the wall 22, and by virtue of an upper portion of the board 54 being secured to the wall 22 by means of a fastening member 58. A photodiode 60 and a light emitting diode (LED) 62 (FIG. 2) are mounted on the inner surface of the board 54, the photodiode 60 and the LED 62 being respectively positioned in two apertures 64 and 66 formed in the wall 22 so that, when the cassette 10 is inserted in the compartment 12, the photodiode 60 and the LED 62 face the cassette 10. The ends 68 (FIGS. 2 and 3) of a U-shaped magnetic core 70 are also respectively positioned in the apertures 64 and 66. The side portions 72 of the core 70 pass through correspondingly-dimensioned apertures 74

Figure 6:
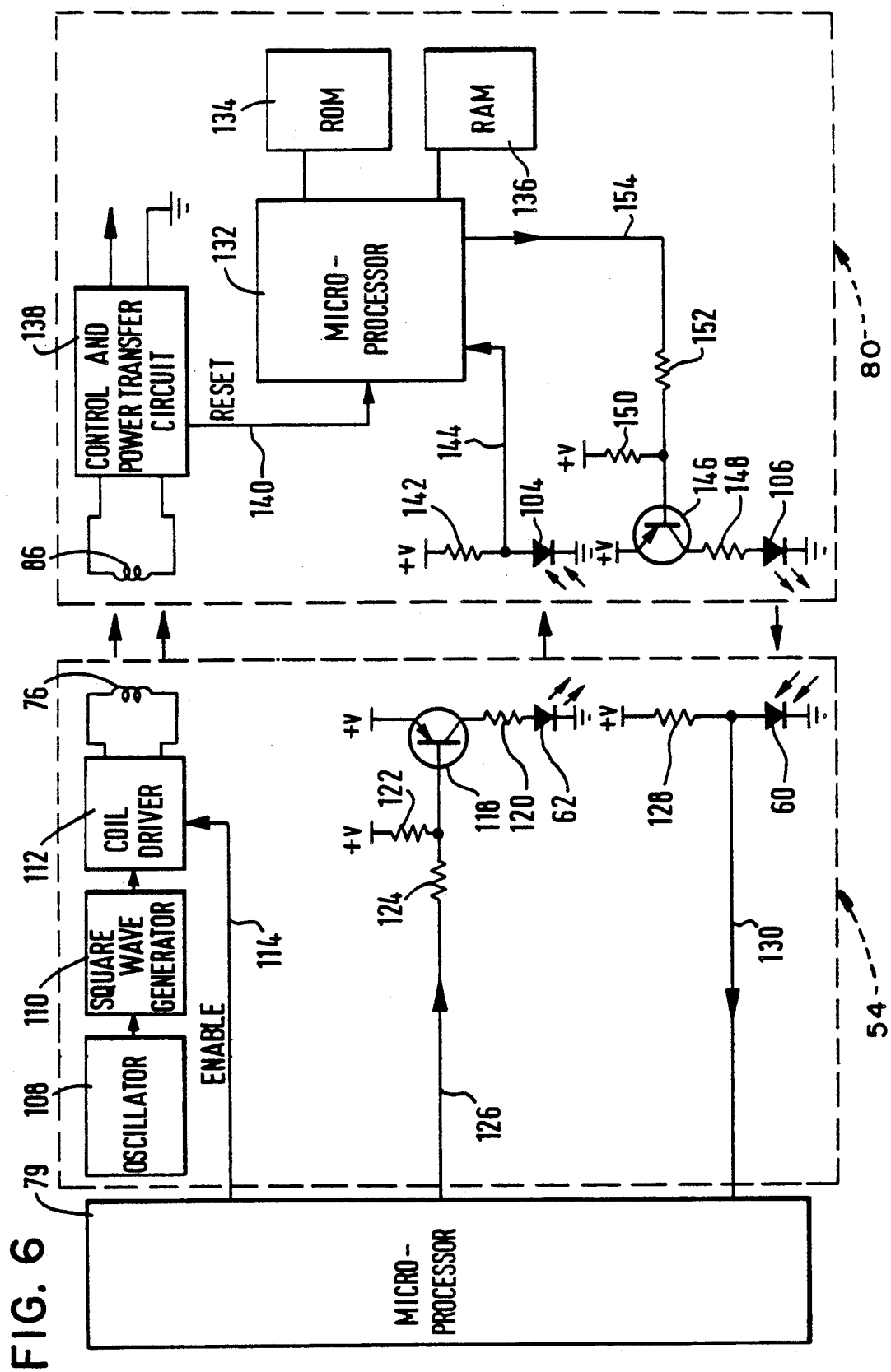
FIG. 6 is a circuit diagram mainly in block form of the data transfer system shown in FIG. 1.

(FIG. 3) formed in the board 54, and a coil 76 comprising 300 turns is wound around the central portion 78 of the core 70. The coil 76 is positioned on that side of the board 54 which is opposite the side on which the photodiode 60 and LED 62 are mounted, and the ends of the coil 76 are electrically connected to the board 54. Other electrical components, which are not shown in FIGS. 2 and 3 but which will be described with reference to FIG. 6, are mounted on the outwardly facing surface of the board 54. An electrical cable (not shown) is connected to the board 54 for applying power to the board 54 and for enabling data transfer to take place between the board 54 and a microprocessor 79 (FIG. 6) which serves to control the operation of the cash dispenser mechanism.

Figure 5:
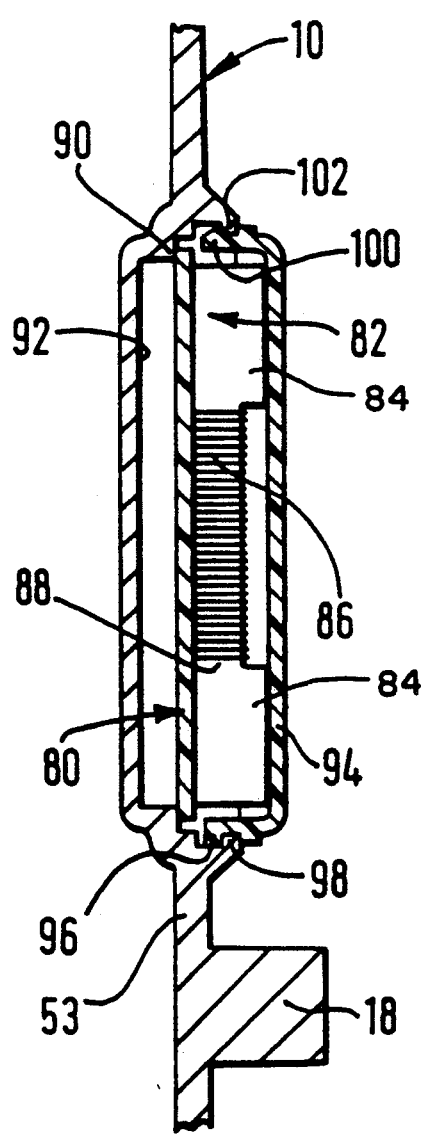
FIG. 5 is a sectional elevational view taken along the line 5—5 of FIG. 4, with FIG. 5 being shown on the sheet containing FIG. 3.
Figure 4:
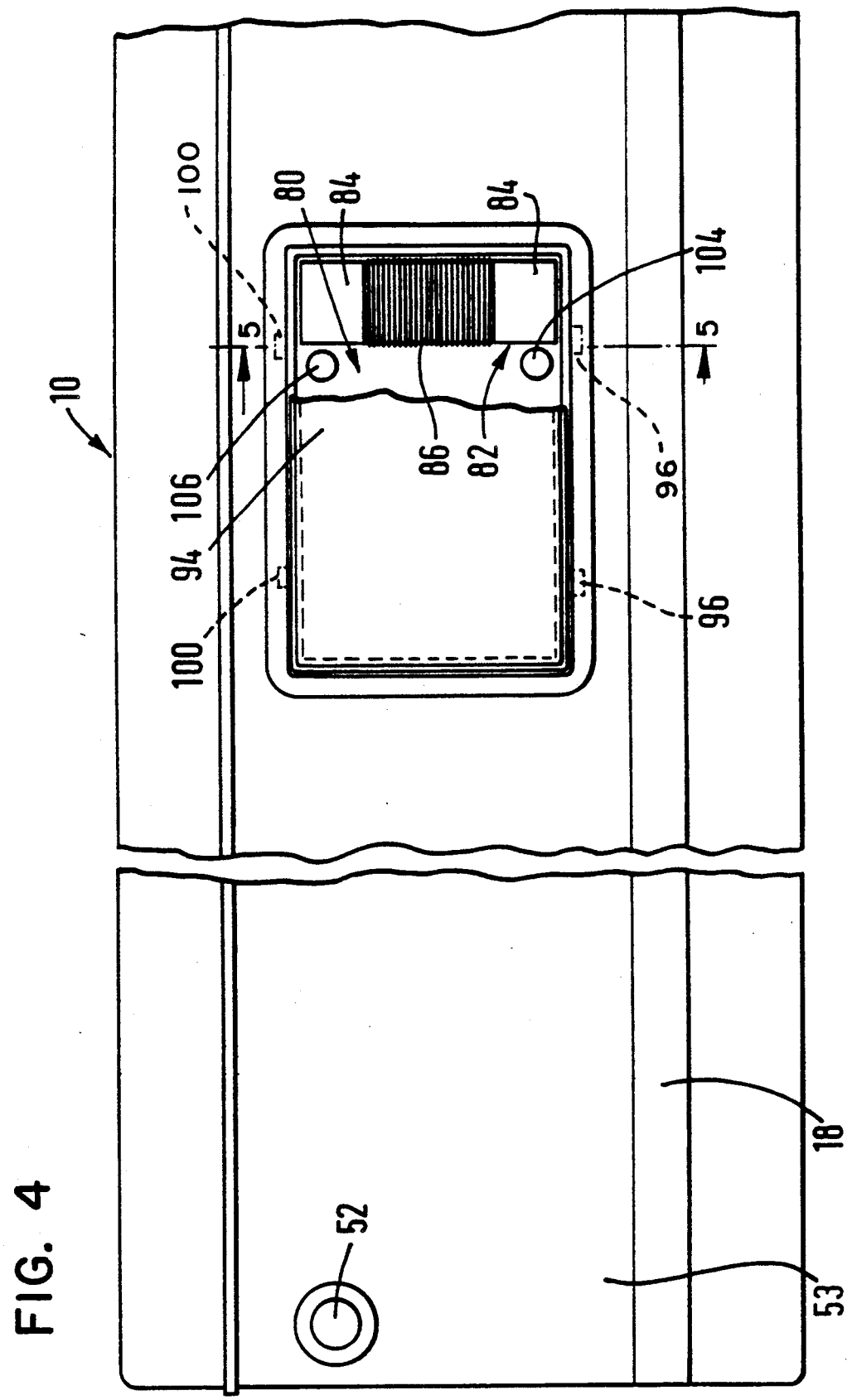
FIG. 4 is a side elevational view of part of one of the side walls of the cassette shown in FIG. 1, a printed circuit board being mounted on this wall.

Referring, now, particularly to FIGS. 4 and 5, a printed circuit board 80 is mounted on the outer surface of the side wall 53 of the cassette 10. A flattened U-shaped magnetic core 82 is mounted on the outwardly facing surface of the board 80 with the ends 84 of the core 82 facing outwards. A coil 86 comprising 200 turns is wound around the central portion 88 of the core 82, the ends of the coil 86 being electrically connected to the printed circuit board 80. As shown in FIG. 5, the periphery of the board 80 engages a shoulder 90 formed around the periphery of a recess 92 in the outer surface of the side wall 53 of the cassette 10. The board 80 is held in position on the side wall 53 by means of a cover 94 (shown partly broken away in FIG. 4) which engages the ends 84 of the core 82 and which is secured to the wall 53. The cover 94 is made of a plastic material which is transmissive to infrared light. The cover 94 is secured to the wall 53 by means of two lugs 96 (FIG. 4) on the lower edge of the cover 94 which lugs engage a first lip 98 (FIG. 5) formed integrally with the wall 53 and is also secured to the wall 53 by means of two latch members 100 on the upper edge of the cover 94 which are adapted to snap into engagement with a second lip 102 formed integrally with the wall 53.

Figure 7:
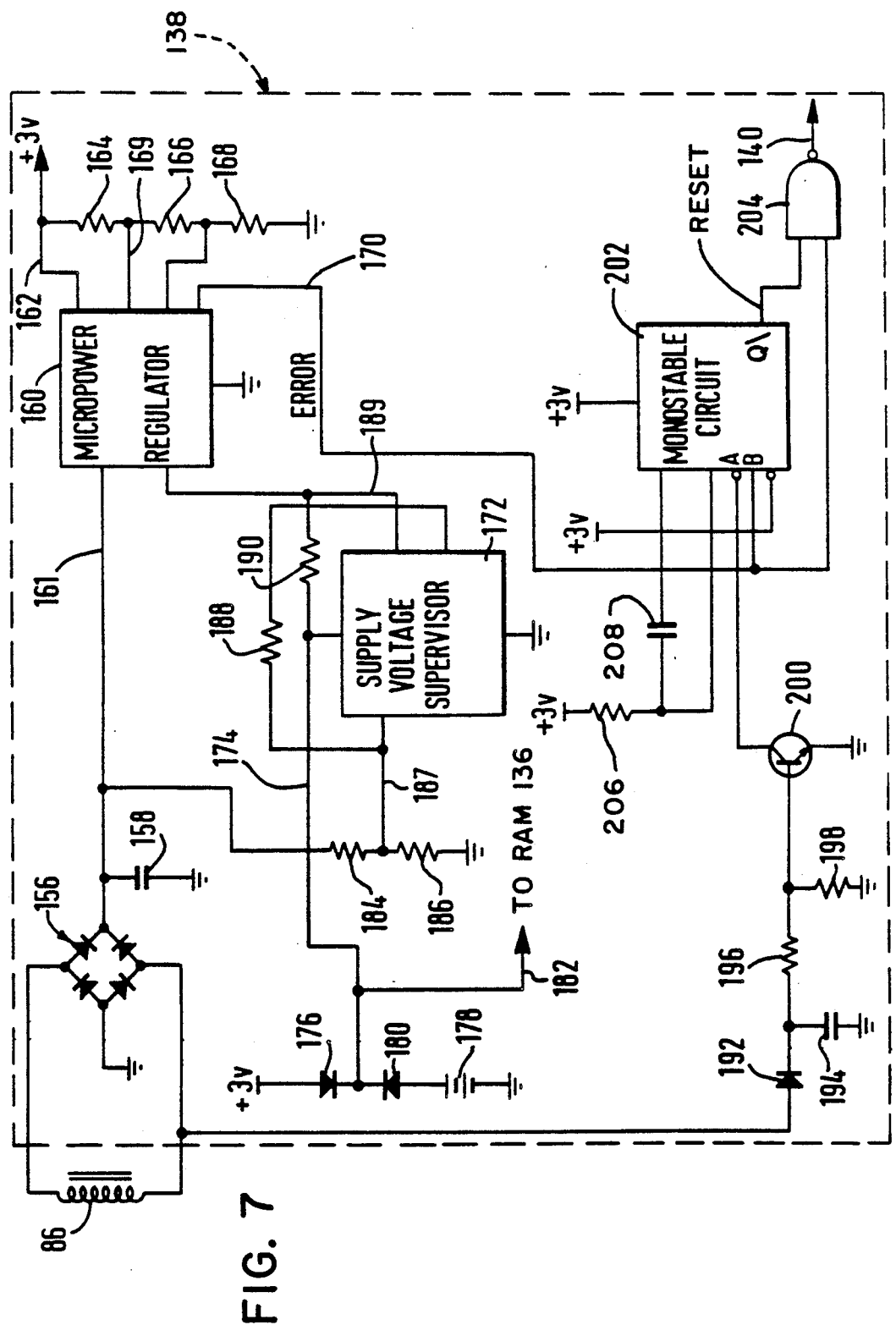
FIG. 7 is a circuit diagram of a control and power transfer circuit included on the printed circuit board of the cassette.

A photodiode 104 and an LED 106 (FIG. 4) are mounted on the outwardly facing surface of the printed circuit board 80 in positions such that, when the cassette 10 is in its correct operational position in the compartment 12, the photodiode 104 is in cooperative relationship with the LED 62 (FIG. 6) mounted on the board 54. Also, when the cassette 10 is in its correct operational position in the compartment 12, the coil 86 is in cooperative relationship with the coil 76 mounted on the board 54, the ends 84 of the core 82 being in register with, and spaced approximately 10 millimeters from, the ends 68 of the core 70. Other electrical components, which are not shown in FIGS. 4 and 5 but which will be described with reference to FIG. 7, are mounted on the board 80, some of these components being accommodated in the recess 92. It should be understood that the LEDs 62 and 106 transmit infrared light, and the photodiodes 60 and 104 are responsive to infrared light.

Referring to FIG. 6, the printed circuit board 54 includes an oscillator 108 which has a frequency of between 1500 and 2000 Hz and which is arranged to operate continuously during operation of the cash dispenser mechanism. The oscillator 108 is connected to the coil 76 via a square wave generator 110 and a coil driver 112 which drives the coil 76 with a 24 v square wave. The coil driver 112 is arranged to be rendered operative for the purpose of driving the coil 76 in response to a signal ENABLE applied to the coil driver 112 over a line 114 from the microprocessor 79 which serves to control the operation of the cash dispenser mechanism. The LED 62 of the printed circuit board 54 is connected as shown in FIG. 6 in a circuit including a transistor 118 and resistors 120, 122 and 124. Binary data signals, in which a high level signal =1 and a low level signal =0, are applied to the base of the transistor 118 from the microprocessor 79 via a line 126. A high level signal turns the transistor 118 off and thereby renders the LED 62 inoperative, and a low level signal turns the transistor 118 on and thereby renders the LED 62 operative. The photodiode 60 is connected as shown in FIG. 6 in a circuit including a resistor 128, the junction between the photodiode 60 and the resistor 128 being connected to the microprocessor 79 via a line 130. Binary data signals, in which, again, a high level signal =1 and a low level signal =0, are applied to the microprocessor 79 over the line 130. Data transfer between the microprocessor 79 and the printed circuit board 54 is at a rate of 300 or 600 bauds, with 8 bits per word.

The printed circuit board 80 includes a microprocessor 132, a read only memory (ROM) 134 in which is stored the program for the microprocessor 132, and a random access memory (RAM) 136 which is connected to the microprocessor 132 and in which is stored information relating to the currency cassette 10 and the contents thereof. Such information includes an identification number for the cassette 10 and the quantity and denomination of the currency notes contained in the cassette 10. If desired, the RAM 136 may also store information as to when and where the cassette 10 was last replenished and information concerning the functional history of the cassette 10. When the cassette 10 is in its correct operational position in the receiving compartment 12, power for the microprocessor 132, ROM 134, and RAM 136 is provided by a control and power transfer circuit 138 which is connected to the coil 86. It should be understood that the coils 76 and 86 together serve as a transformer whereby power may be transferred in operation from the printed circuit board 54 to the printed circuit board 80. As will be explained in more detail later, the circuit 138 also serves to apply a pulse RESET to the microprocessor 132 over a line 140 for the purpose of rendering the microprocessor 132 operational.

The photodiode 104 of the printed circuit board 80 is connected, as shown in FIG. 6, in a circuit including a resistor 142, the junction between the photodiode 104 and the resistor 142 being connected to the microprocessor 132 over a line 144. Also, the LED 106 is connected as shown in FIG. 6 in a circuit including a transistor 146 and resistors 148, 150 and 152, the base of the transistor 146 being connected to the microprocessor 132 via a line 154. In a similar manner to the transfer of data between the microprocessor 79 and the photodiode 60 and LED 62, data signals are applied by the photodiode 104 to the microprocessor 132 via the line 144, and data signals are applied by the microprocessor 132 to the LED 106 via the line 154, data transfer within the printed circuit board 80 also being at a rate of 300 or 600 bauds. In operation, data transfer from the printed circuit board 80 to the printed circuit board 54 takes place by virtue of infrared light from the LED 106, when activated, falling upon the photodiode 60, and data transfer from the board 54 to the board 80 taken place by virtue of infrared light from LED 62, when activated, falling upon the photodiode 104.

Referring now to FIG. 7, the control and power transfer circuit 138 includes a rectifier circuit 156 which is connected across the coil 86. In operation, an AC voltage of about 7 volts peak to peak is developed across the coil 86 in response to the alternating current flowing in the coil 76. This AC voltage is smoothed by a capacitor 158 and applied to an input terminal of a micropower regulator 160. The micropower regulator 160 provides a regulated +3 v output voltage supply on an output line 162, this output voltage being set by resistors 164, 166 and 168 which are connected between the line 162 and ground and to the regulator 160 as shown in FIG. 7. The voltage on the line 162 serves as the power supply for the microprocessor 132, ROM 134, RAM 136, photodiode 104, transistor 146 and LED 106, and other components included in the circuit 138. The micropower regulator 160 also serves as a comparator to indicate when the regulated output voltage on the line 162 falls below a predetermined specification. The comparator function is effected by the micropower regulator 160 by having a signal applied to a terminal of the regulator 160 over a line 169, and a signal ERROR appears on an output line 170 in the event of the regulated output voltage falling below said predetermined specification.

The control and power transfer circuit 138 (FIG. 7) also includes a supply voltage supervisor 172. In normal operation, when the cassette 10 is mounted in the receiving compartment 12, power to the supply voltage supervisor 172 is provided over a line 174 from the regulated output voltage supply line 162 via a forward biased diode 176. A lithium battery 178 is connected to the line 174 via a diode 180 which is reverse biased during normal operation of the cassette 10. In the event of the cassette 10 being removed from the receiving compartment 12, the diode 180 becomes forward biased so that a back-up power supply is provided by the battery 178 to the voltage supervisor 172 over the line 174. This back-up power supply is also provided to the RAM 136 over a line 182, but at this time the diode 176 is reverse biased so as to prevent battery current being applied to other components of the cassette 10. Two resistors 184 and 186 are connected in series between the output of the rectifier circuit 156 and ground, the junction between the resistors 184 and 186 being connected to an input terminal of the supply voltage supervisor 172 over a line 187. The line 187 is also connected via a resistor 188 to a first output terminal of the voltage supervisor 172, and a second output terminal of the supervisor 172 is connected to a terminal of the micropower regulator 160 over a line 189, the line 189 being connected via a resistor 190 to the line 174. The voltage supervisor 172 monitors the unregulated output voltage appearing at the output of the rectifier circuit 156, and in the event of this voltage falling below 3.6 v peak to peak, the supervisor 172 will shut down the micropower regulator 160 by applying an appropriate signal to the regulator 160 over the line 189.

A circuit comprising a diode 192, capacitor 194, resistors 196 and 198, and a transistor 200 is connected, as shown in FIG. 7, between a terminal of the coil 86 and an input terminal A of a monostable circuit 202. The line 170 is connected to another input terminal B of the monostable circuit 202 and to a first input terminal of a gate 204, an output terminal Q\ (read as Q Bar) of the monostable circuit 202 being connected to a second input of the gate 204. Other connections including the resistor 206 and the capacitor 208 are made to the monostable circuit 202 as shown in FIG. 7. When the inductive power supply comprising the coils 76 and 86 is active, the circuit including the components 192, 194, 196, 198, 200 provides a signal to the input terminal A of the monostable circuit 202 which enables this circuit 202. With the monostable circuit 202 enabled, upon the regulated voltage supply on the line 162 coming within the required specification, the monostable circuit 202 is triggered in response to the signal ERROR on the line 170 becoming inactive. Upon the monostable circuit 202 being triggered, a high pulse RESET is generated at the output terminal Q\ , this pulse being applied via the gate 204 and the line 140 (see also FIG. 6) to the microprocessor 132 so as to cause the microprocessor 132 to commence operation using the program stored in the ROM 134. After the cessation of the pulse RESET with the microprocessor 132 operational, the signal on the line 140 will be low. In the event of a signal ERROR again appearing on the line 170 as a result of the regulated voltage on the line 162 going out of specification, the signal on the line 140 will go permanently high thereby causing the microprocessor 132 (FIG. 6) to be rendered inoperative.

The operation of the data transfer system will now be described. Prior to the cassette 10, which is loaded with currency notes, being inserted into the receiving compartment 12, information as to the contents of the cassette 10 is written into the RAM 136 at the establishment where the cassette 10 is loaded. The cassette 10 is inserted into the receiving compartment 12 in the manner previously described, the latch stud 52 (FIG. 4) engaging the recess 32 (FIG. 2) in the latch and stop member 26 so as to latch the cassette 10 in its correct operational position, with the coil 86 (FIG. 5) positioned in cooperative relationship with respect to the coil 76 (FIG. 3) and with the photodiode 104 and LED 106 (FIG. 6) respectively positioned in cooperative relationship with the LED 62 and the photodiode 60. Activation of the cassette 10 is initiated by the microprocessor 79 (FIG. 6) applying a signal ENABLE over the line 114 to the coil driver 112 so as to activate the coil 76 and thereby cause power to commence to be transferred from the board 54 to the board 80 via the transformer formed by the coils 76 and 86. Upon the regulated voltage on the line 162 (FIG. 7) reaching the required specification, a signal RESET will be applied to the microprocessor 132 over the line 140 thereby rendering the microprocessor 132 operational. The cassette 10 is now in a condition ready for currency notes to be picked therefrom and for data to be transferred between the RAM 136 and the microprocessor 79. Initially, the microprocessor 132 reads from the RAM 136 information as to the contents of the cassette 10 and as to the identification number of the cassette 10 and then transmits data representing this information via the line 154 to the circuit including the LED 106. This data is then transmitted by the LED 106 to the photodiode 60 in the manner previously described, and from the photodiode 60, the data is transmitted over the line 130 to the microprocessor 79. After each pick operation in the course of which one or more currency notes are extracted from the cassette 10, the microprocessor 79 transmits to the LED 62 over the line 126 data representing the number of notes picked in the operation. This data is then transmitted by the LED 62 to the photodiode 104, from where the data is transmitted over the line 144 to the microprocessor 132 which causes to be written in the RAM 136 data representing the number of notes remaining in the cassette 10. It should be understood that when the cassette 10 is removed from the receiving compartment 12, the lithium battery 178 provides back-up power for the RAM 136 so as to prevent the loss of stored data.

The data transfer system described above has the advantage that, since data transfer between the cassette 10 and the microprocessor 79 takes place in a non-contact manner, the system is highly reliable in operation and does not require extreme accuracy of positioning of the cassette 10 relative to the receiving compartment 12. Also, since a random access memory is used as the data storage means of the cassette 10 an extremely large amount of information can be stored in the cassette 10. Further, since power is transferred in operation to the cassette 10 via the coils 76 and 86, the battery 178 of the cassette 10 can have a very long life, since it is only required to provide power for preventing loss of stored data when the cassette 10 is in a non-operational condition.

In an alternative embodiment of a data transfer system in accordance with the present invention, data transfer between the cassette 10 and the microprocessor 79 could take place via two further cooperating coils, one of these coils being mounted on the board 54 in place of the photodiode 60 and LED 62, and the other of these coils being mounted on the board 80 in place of the photodiode 104 and LED 106. In this alternative embodiment, data transfer to and from each of the further coils would take place via a respective modem.

What is claimed is:

1. In an automated teller machine, a system comprising:
   a currency dispensing means for dispensing currency;
   a cassette for storing currency to be dispensed;
   a cassette receiving means located in said currency dispensing means for receiving said cassette;
   said cassette having first data processing means for processing data associated with the currency to be dispensed;
   said cassette receiving means having second data processing means for processing data associated with the currency to be dispensed;
   said cassette also having first circuit means for processing power to be used by said first data processing means;
   said cassette receiving means also having second circuit means for processing power to be used by said first data processing means; and
   said first and second circuit means including first and second coils, respectively, with said first and second coils acting as a transformer when said cassette is mounted in an operational position in said cassette receiving means so as to transfer power from said second circuit means to said first circuit means.

2. The system as claimed in claim 1 in which said first data processing means includes a first data receiving and transmitting means located in said cassette and in which said second data processing means includes a second data receiving and transmitting means located in said cassette receiving means, with said first and second data receiving and transmitting means being in operational relationship with each other so as to receive and transmit data between said first and second data processing means when said cassette is mounted in the operational position in said cassette receiving means.

3. The system as claimed in claim 2 in which said first data processing means includes a microprocessor and a data storage means for storing data associated with said cassette and with the currency to be dispensed.

4. The system as claimed in claim 3 in which said data storage means includes a ROM and a RAM.

5. The system as claimed in claim 2 in which said first and second data receiving and transmitting means are optically operated.

6. The system as claimed in claim 5 in which said first circuit means includes a battery for retaining data in said RAM when said cassette is removed from said operational position in said cassette receiving means.

7. A data transfer system comprising:
   a currency cassette having data storage means; and
   currency dispensing means for dispensing currency;
   said currency dispensing means having a cassette receiving means into which said cassette is adapted to be inserted;
   said cassette having random access memory means forming said data storage means, first data receiving and transmitting means, first data processing means connected to said random access memory means and to said first data receiving and transmitting means, and first circuit means including a first coil means;
   said cassette receiving means including second data receiving and transmitting means and second circuit means including second coil means, said second data receiving and transmitting means and said second coil means being mounted on said cassette receiving means so as to be respectively positioned adjacent said first data receiving and transmitting means and said first coil means when said cassette is mounted in an operational position in said cassette receiving means to enable data to be transferred in a non-contact manner between said random access memory means and second data processing means external to said cassette via said first data processing means and said first and second data receiving and transmitting means, and to enable said first and second circuit means to transfer power from said cassette receiving means to said cassette with said first and second coil means acting as a transformer, said first circuit means serving to provide a dc voltage supply for said cassette.

8. The system as claimed in claim 7, in which said first data receiving and transmitting means includes a first light responsive device and a first light emitting device, and said second data receiving and transmitting means includes a second light responsive device and a second light emitting device, said first light responsive device and said first light emitting device being respectively in cooperative relationship with said second light emitting device and said second light responsive device when said cassette is mounted in said operational position.

9. The system as claimed in claim 8 in which said first and second data receiving and transmitting means are each adapted to transmit and to be responsive to infrared light, and in which said random access memory means, said first data receiving and transmitting means, said first data processing means, and said first circuit means are protected by a cover which is of a material transmissive to infrared light.

10. The system as claimed in claim 9 in which said first circuit means is arranged to provide a dc voltage supply for said random access memory means, said first data processing means and said first data receiving and transmitting means.

11. The system as claimed in claim 10 in which said cassette has mounted thereon a battery arranged to provide back-up power for said cassette when said cassette is not in said operational position in said cassette receiving means, said battery being associated with means for disabling said battery from supplying power to said cassette when said cassette is receiving its power requirements from said first circuit means.

12. The system as claimed in claim 11 in which said random access memory means, said first data receiving and transmitting means, said first data processing means, and said first circuit means are mounted on a first printed circuit board attached to the outside of said cassette, and in which said second data receiving and transmitting means and said second circuit means are mounted on a second printed circuit board attached to said cassette receiving means.

13. The system as claimed in claim 12 in which said cassette further has a stud thereon and said cassette receiving means has a latch means for latching said stud to latch said cassette in said operational position in said cassette receiving means.

14. The system as claimed in claim 13 in which said first and second coil means are respectively wound on first and second U-shaped magnetic cores, with the ends of said first core being in registration with the ends of said second core when said cassette is in said operational position in said cassette receiving means.

15. The system as claimed in claim 7 in which said first circuit means includes means to render said first data processing means operational when said dc voltage supply meets a predetermined specification, and to render said first data processing means non-operational when said dc voltage supply fails to meet said specification.

16. A currency cassette having data storage means; said cassette comprising:

random access memory means forming said data storage means;

data processing means connected to said random access memory means;

first data receiving means connected to said first data processing means to receive data in a non-contact manner from first data transmitting means external to said cassette;

said data processing means further comprising:

means to write the received data into said random access memory means;

second data transmitting means adapted to receive data from said random access memory means via said data processing means and to transmit this data in a non-contact manner to second data receiving means external to said cassette; and first circuit means including first coil means adapted to receive power from second circuit means including second coil means external to said cassette, with said first and second coil means acting as a transformer, and with said first circuit means serving to provide a dc voltage supply for said cassette.

* * * * *